United States Patent [19]

Janos

[11] 4,373,324
[45] Feb. 15, 1983

[54] GUIDE APPARATUS FOR FLEXIBLE ELEMENTS CONNECTED TO RELATIVELY MOVING UNITS

[75] Inventor: Alfred G. Janos, Hustisford, Wis.

[73] Assignee: Maysteel Corporation, Mayville, Wis.

[21] Appl. No.: 182,863

[22] Filed: Sep. 2, 1980

[51] Int. Cl.³ .............................................. F16G 13/16
[52] U.S. Cl. ...................................................... 59/78.1
[58] Field of Search ....................... 59/78.1; 191/12 C; 138/110, 120; 248/68 R, 68 A, 78 R, 49, 51, 52

[56] References Cited

U.S. PATENT DOCUMENTS 3,546,875 12/1970 Weber .................................... 59/78.1

Primary Examiner—Mark Rosenbaum
Assistant Examiner—Timothy V. Eley
Attorney, Agent, or Firm—Andrus, Sceales, Starke & Sawall

[57] ABSTRACT

A guide for flexible power lines connecting a power supply to a moving device includes a plurality of similar rectangular tubular duct elements mounted with adjacent elements telescoped into each other and pivotally connected to form a beam support in the linear direction and a curved support between the beam supports. Each element is a cast element of a suitable metal or other material having relatively heavy walls. The side walls include offset planar wall interconnected by transverse interior stop walls which are angularly oriented and shaped. The stop walls and the outer side wall end edges of the adjacent element are similarly shaped with first and second opposed wall portions. The first wall portion of the side walls abut in the beam position and the second wall portions are spaced by the maximum pivotal movement. The opposite outer end walls are cast with complementing curved surfaces, each having a radius which differs only slightly from the opposed surface, to establish a relatively close and constant spacement between the adjacent elements during the pivotal movement. The end walls may also include pivot stop wall portions.

21 Claims, 13 Drawing Figures

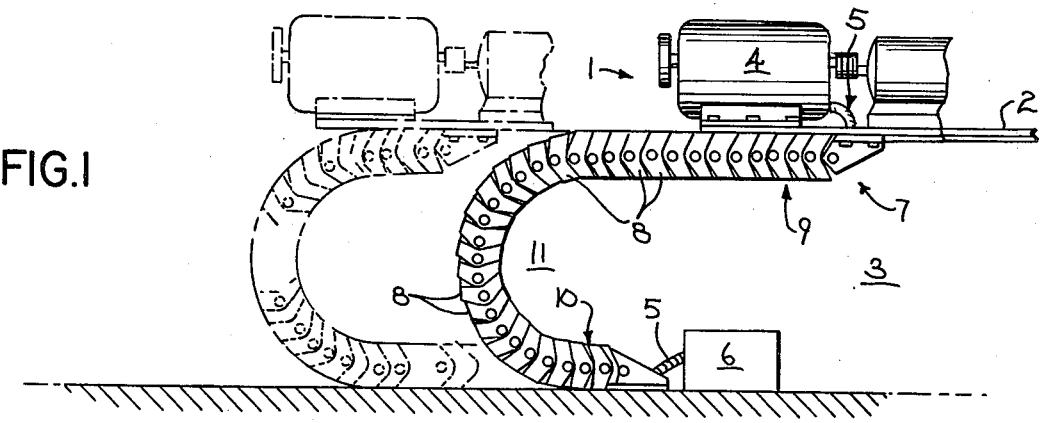
FIG.1
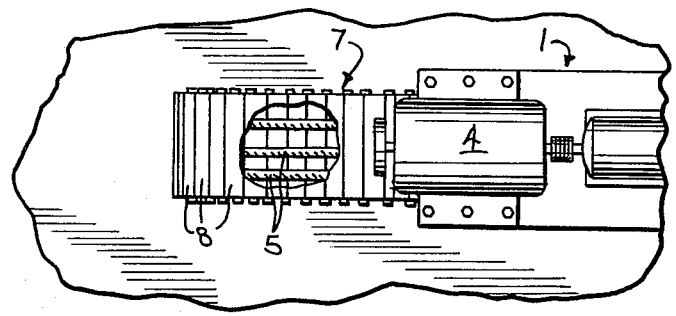
FIG.2
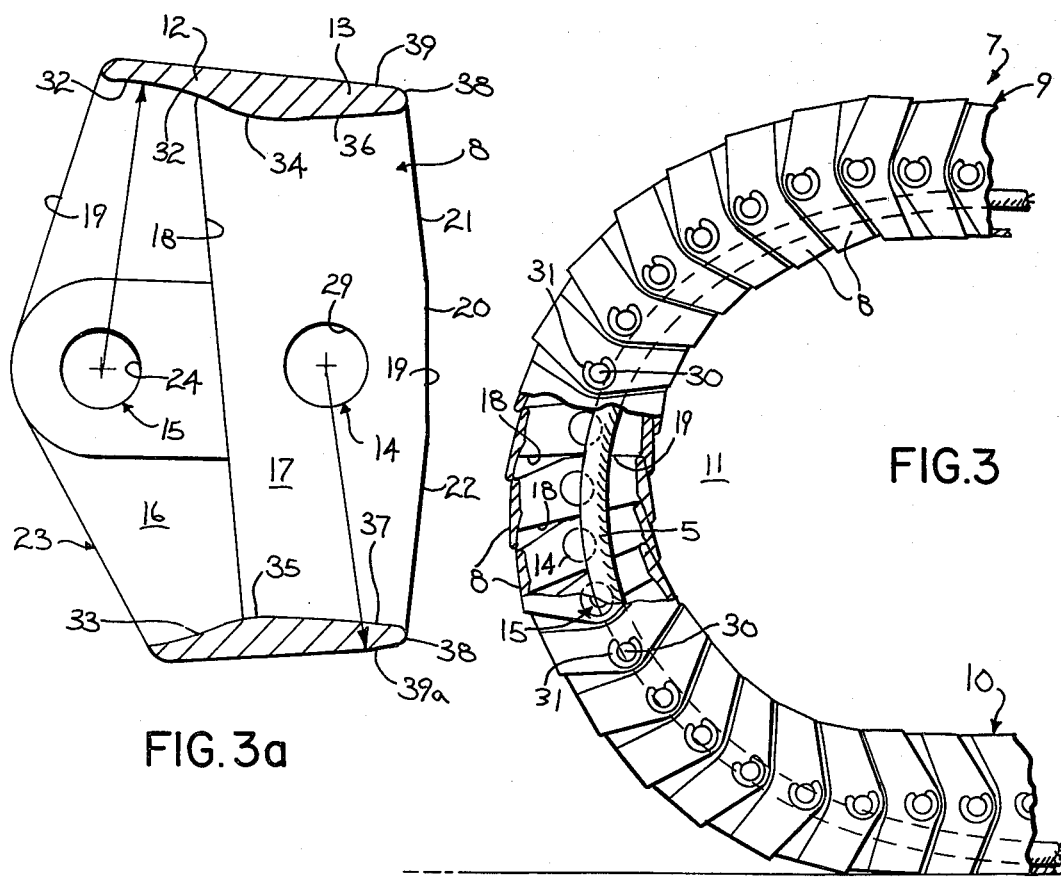
FIG.3
FIG.3a

GUIDE APPARATUS FOR FLEXIBLE ELEMENTS CONNECTED TO RELATIVELY MOVING UNITS

BACKGROUND OF THE PRESENT INVENTION

This invention relates to a flexible guide apparatus for supporting elongated flexible line elements in a generally U-shaped configuration connected between a pair of units which are mounted for moving relatively to each other in generally parallel relationship, and particularly for supporting power transmitting lines connected between a supply unit and a moving load unit.

Various movable industrial equipment may be connected by flexible elongated elements to other equipment. Typical installations are discussed in U.S. Pat. No. 3,330,105 wherein supply lines for transmission of energy and fluids such as electrical energy, pressurized gas and/or liquid and the like connect a supply or source to a consuming load device. In the installation, the load device moves back and forth over the source. The interconnecting flexible elements move in a U-shaped path as the result of the movement of the load device relative to the source. The flexible elements should be supported and preferably protected from the surrounding environment, as generally set forth in the above patent. Various chain-type guide devices have been suggested in the prior art and some are commercially available. Typical systems are shown in U.S. Pat. Nos. 4,111,236; 4,084,370; 3,921,388; 3,848,047; 3,772,875; 3,664,619; 3,546,875; 3,382,668; 3,337,696; 3,330,105; 3,282,044; 3,291,921; 3,197,954; 3,157,376; 3,089,349; 2,975,807; and 2,864,907. These and similar patents generally disclose flexible element guides consisting of a series of articulated chain link elements pivotally interconnected to each other and arranged with spaced straight beam sections connected by a curved transfer or re-entry section to establish the desired orientation and movement of the flexible elements. The chain link units are specially constructed to permit the necessary pivotal movement of the individual links for movement about the curved re-entry section of the unit while preventing opposite pivotal movement to create upper and lower supporting beam sections for the energy transmitting lines to the opposite sides of the re-entry section. The chain link units are specially constructed and arranged to hold and locate the flexible elements within the re-entry section on a neutral bending axis to essentially avoid stretching and compression of the element as it moves about the re-entry section. A theoretical discussion of the relationship is given in U.S. Pat. No. 2,864,907. The controlled bending of the cable or other flexible line is important to prevent the creation of fatigue and damage to the element as it moves back and forth through the bend or re-entry section, and thereby contributes to a long operating life for the element.

Such guide devices have generally been made as chain link elements with supporting crossbraces having individual guide openings for physically supporting the several flexible elements. Enclosures have also been suggested to protect the cables from the surrounding environment. A sheet metal enclosure is shown in U.S. Pat. No. 3,330,105. A similar total enclosure formed of a series of tubular sheet-metal elements with reverse bent and mating edges is also shown in U.S. Pat. No. 4,111,236.

A sheet metal construction is not particularly adapted to application in those environments where abrasion must be avoided. The energy carrying devices are often electrical cables, hydraulic or pneumatic cables, conduits or the like. It is of course extremely important that the cable supporting guide construction minimize any interengaging abrasive engagement with the flexible elements. Many of the proposed units with the special channel supports and the like must also be carefully constructed to avoid the sharp abrasive edges or the like. Although various prior art guides are commercially available, and others have been shown in patents, certain disadvantages exist in such devices from the standpoint of construction and functioning.

There is therefore a need for a tubular enclosure having means to reliably support the flexible elements with the appropriate beam and bending characteristic while providing for practical commercial production.

SUMMARY OF THE PRESENT INVENTION

The present invention is particularly directed to an improved supporting duct structure of an enclosing characteristic defining an essentially continuous tubular supporting guide in which the flexible elements are located and supported. Generally, in accordance with the present invention each tubular duct element is provided with a telescoping section at one end adapted to telescope into an adjacent duct element and a telescoped section at the opposite end adapted to telescope over the opposite adjacent element. A series of the elements with similar orientation and overlapping of the telescoping and telescoped sections are pivotally interconnected by a separate pivot connectors to form a continuous duct. Each duct element includes a pair of pivot connections including an intermediate pivot connection for interconnection of the telescoped section within the telescoping section and an outer pivot connection for the opposite sections. The pivot connections may be provided appropriately spaced along the side walls or an outer wall and are preferably centrally located on the side wall to establish the desired pivotal movement of the duct elements about the predetermined radius. Each duct element also includes a side wall structure with the telescoping and telescoped sections offset and interconnected by a transverse interior stop wall as well as top and bottom walls shaped to complement the telescoping and telescoped sections of the adjacent duct elements. The duct elements are readily fabricated from a supportable lightweight, cast material which may be a metal such as aluminum, a suitable plastic such as a high strength plastic or other suitable material, and may be formed to provide an essentially total enclosure; although one or more of the elements may be provided with appropriate openings if so desired or required. The elements can be directly cast with all smooth edges such that the appropriately curved interior top and bottom walls provide a smooth essentially minimal friction support for the guided elements.

More particularly, in accordance with a preferred embodiment of the present invention, the guide is formed of a plurality of similar tubular duct elements of a transverse rectangular configuration. Each tubular duct element is formed as a cast element having end walls and interconnecting side walls. The side walls include offset planar wall portions in the respective telescoping and telescoped sections interconnected by transverse interior stop walls which are angularly oriented. The adjacent side wall and end edges of the adjacent duct elements are shaped to define cooperating stop walls. The opposed stop wall portions are shaped in accordance with the desired permitted pivotal motion of the adjacent elements. The side walls also include the offset exterior wall surfaces connected by an exterior transverse wall which are so oriented and constructed to maintain a spacing from the adjacent duct. The top and bottom walls are cast with complementing shaped surfaces and preferably curved surfaces each having a radius which differs only slightly from the opposed surface to establish a relatively close and constant spacement between the adjacent elements during the pivotal movement. The guide unit is thus formed with the stop wall means totally enclosed within the guide to protect personnel from possible pinching engagement within the pivoted elements.

The telescoping and telescoped sections may be further formed of different lengths to further provide interrelated support and limit movement of the adjacent duct elements. The pivot connection between the elements can of course be of any suitable form, such as separate pivot pins interconnected to appropriate pivot openings in the side walls or the like.

The present invention has been found to provide an economical guide construction for guiding conveying elements such as electrical cables, fluid and hydraulic conduits or tubing and the like and which may be practically mass produced with readily available and known production processes.

DESCRIPTION OF THE DRAWING FIGURES

The drawings furnished herewith illustrate a preferred construction of the present invention in which the above advantages and features are clearly disclosed as well as others which will be readily understood from the following description.

In the drawings:

FIG. 1 is a side elevational view of a flexible guide constructed in accordance with one embodiment of the present invention and applied to supporting power cables interconnected between a trolley element and a stationary power supply unit, with certain parts broken away and sectioned to show detail of the illustrated embodiment;

FIG. 2 is a fragmentary plan view of the bending portion of the guide and with parts broken away and sectioned to show detail of construction;

FIG. 3 is an enlarged side view of duct elements shown in FIGS. 1 and 2;

FIG. 3a is an enlarged sectional view of one duct element;

DESCRIPTION OF THE ILLUSTRATED EMBODIMENT

Figure 4:
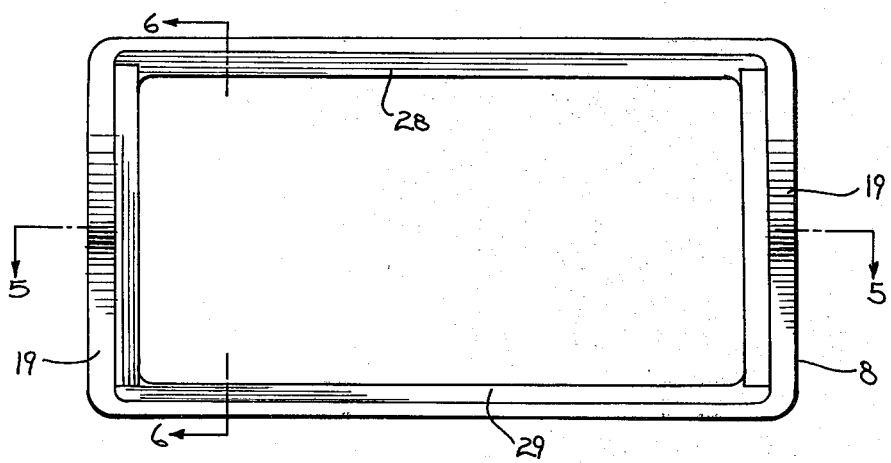
FIG. 4 is an enlarged end view of the duct element.

Referring to the drawings and particularly to FIG. 1, a crane trolley unit 1 is mounted for rectilinear movement along a track 2 over a work area 3. The trolley unit 1 is power driven through a suitable electric motor 4. Power is supplied to the motor by elongated flexible cables 5 which are secured at one end to the trolley motor 4 and at the opposite end to a power supply 6. The trolley unit 1 moves over and to the opposite sides of the power supply 6 which may be located centrally of the limits of the trolley track. With the trolley unit 1 located adjacent to the fixed supply point, the power cable has a top run extending generally horizontally beneath the trolley track 2 to a re-entry bend portion and a straight bottom run extending horizontally in a return extent to the fixed power supply 6. As the trolley unit 1 moves along its track 2 to the right in FIG. 1, the top run of cable 5 is pulled along with the trolley and the lower run bends around the re-entry bend into the top run. In order to support and guide the cables in the desired straight runs and proper re-entry bend, the cables are mounted within a tubular guide 7 secured to the trolley unit 1 and to the power supply unit 6. The guide 7 is an articulated member and moves with the fixed trolley unit 1 in a defined path for supporting the power cables 5 moving along the straight line sections and the curved re-entry section. The illustrated guide 7 is an elongated tubular duct construction including a plurality of interconnected duct elements 8 which are specially constructed to define rigid rectilinear support beam sections 9 and 10 along a straight line path to the opposite side of the curved re-entry section 11. Thus, the individual duct elements 8 are interconnected to each other to allow limited pivotal movement in the direction required to move around and to define the curved re-entry section 11 joining the two straight line beam portions or sections 9 and 10. The duct elements 8 are specially constructed to cooperate with each other to prevent reverse pivotal movement and specifically to define rigid rectilinear support beams in the top and bottom runs to the opposite ends of the curved re-entry section 11.

The present invention is particularly directed to the construction of the guide unit and more particularly the structure and interconnection of the individual elements to form an improved guide. Consequently no further description is given of the other illustrated components or system other than as necessary to clearly understand the structure, functioning and features of the illustrated embodiments of the invention.

Referring particularly to FIGS. 3-6, a preferred embodiment of the present invention is illustrated. Each duct element 8 is shown as an integral tubular element formed of metal or other suitable material. Thus, the element may be conveniently and advantageously formed of aluminum. In certain applications requiring particular electrical and/or thermal characteristics, a high strength plastic, which may also include a suitable reinforcing means, may be used. The element is preferably formed by casting, molding or other similar process; herein referred to generically as a "cast" element or process. The illustrated duct element has a rectangular cross section with opposite specially and similarly shaped side walls and specially shaped top and bottom or end walls. As shown most clearly in FIGS. 3a, 5 and 6, each duct element 8 includes a telescoping section 12 which telescopes over the adjacent duct element and a telescoped section 13 which telescopes into the opposite adjacent duct element 8. All of the adjacent duct elements 8 are thus mounted in telescoping and telescoped relationship and include an intermediate pivot connection 14 and a spaced end pivot connection 15 for interconnecting of the duct elements 8 to form a continuous tubular beam support as well as a protective enclosure. The specially shaped side, top and bottom walls permit limited rotation in a direction for following the re-entry section 11 with load movement while preventing rotation in the opposite direction to thereby form the straight top and bottom support beam sections 9 and 10.

Figure 5:
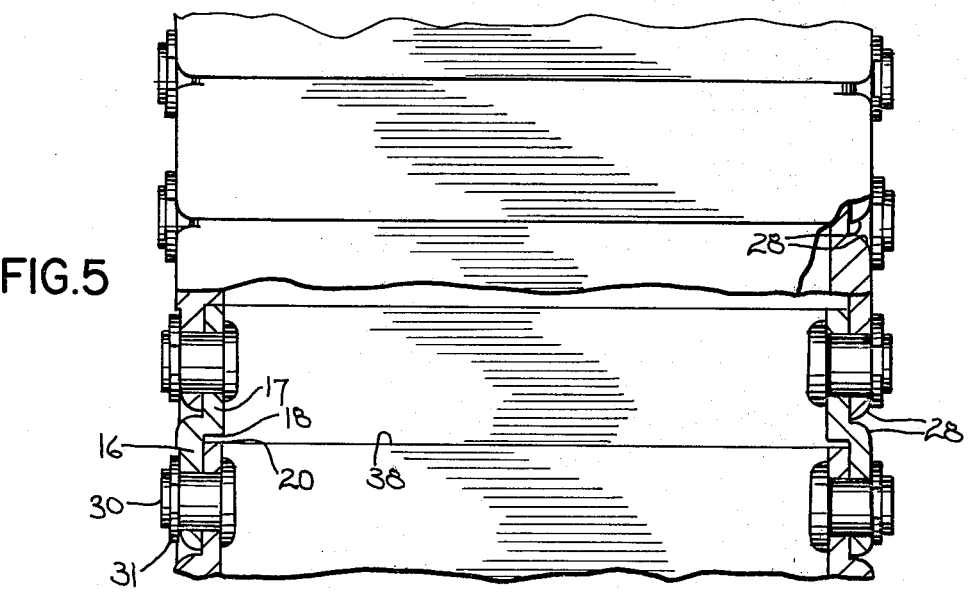
FIG. 5 is a fragmentary plan view with parts broken away and sectioned.

Referring particularly to FIGS. 3-5, each duct side wall is similarly shaped and includes a planar wall 16 in the telescoping section 12 which is outwardly offset from a planar wall 17 in the telescoped section 13. The planar walls 16 and 17 are connected by a transverse connecting wall defining a specially shaped interior stop wall 18. The thickness of side walls 16 and 17 are substantially constant to form interior walls which are offset and joined by the vertical transverse and stop wall 18. The telescoped section wall 17 is offset to locate the exterior wall slightly inwardly of the interior surface of the telescoping section 12 and thus provide for the telescoping of adjacent elements. The transverse stop wall 18 within the duct element is spaced from the end edge wall 19 of the adjacent duct element to permit only limited pivotal motion in the direction required to travers re-entry section 11, as shown in FIG. 3. Thus, the end edge 19 of the adjacent duct is provided with a configured shape, which in the assembled position, cooperates with the stop wall 18 to form beam sections 9 and 10 and permit limited pivotal movement through section 11, as follows. In the preferred embodiment, wall 18 is an essentially straight inclined wall which is located substantially centrally of the duct element and between spaced pivot connections 14 and 15, as most clearly shown in FIG. 3a. The cooperating end edge 19 of the duct element is formed with a central portion 20 from which first and second inclined stop wall portions 21 and 22 extend inwardly of the duct element. The first stop wall portion 21 forms an angle to the vertical and the central portion 20 essentially the same as the interior stop wall 18. In the beam position, stop wall portion 21 abutts the aligned portion of wall 18 and prevents reverse pivoting, thereby establishing the beam section 9 or 10. The second stop wall portion 22 has a substantially smaller angle to the vertical and the central portion 20 and is spaced from the stop wall 18 in the interconnected beam position, as shown at 22a in FIG. 6. The spacing of the inner stop portions permits the relative pivotal movement of the adjacent duct elements relative each other and thus through the re-entry section 11. The side walls 16 may be formed with a slight relief angle or taper relative to the wall such as three degrees to facilitate casting.

The opposite end edge 23 of the side wall 16 is generally V-shaped, with a pivot opening 24 formed in the outer apex portion of the side wall. The offset planar side walls 16 and 17 are joined by an integral transverse exterior wall 25 which is also of a similar V-shape. As viewed in FIGS. 3 and 6, the upper or outer portions of wall 25 and the end edge 23 are parallel to each other, as shown at 26 in FIG. 6, and the bottom or inner portions thereof are angularly offset as at 26a, by the predesigned pivot angle generally corresponding to that through which the duct elements 8 must pivot in moving about the re-entry bend section 11 of the articulated guide. The generally complementing end edge 23 and transverse wall 25 are spaced from each other in all positions of the telescoped duct elements. The edges 23 and wall 25 move toward and away from each other to vary the gap or spacement therebetween, but are always spaced sufficiently to prevent pinching of a hand, structural element or the like therein. The outer transverse wall 25, as well as the end edge 23, are also specially shaped with smooth curved surfaces as at 28 to further avoid any pinching action.

The telescoped planar wall 17 also includes a pivot support opening 29 aligned with the opening 24 in the telescoping planar wall 16. In the assembled relation, the openings 24 and 29 of adjacent duct elements 8 are pivotally connected, as by pivot pin 30 secured in place by a snap ring 31. Suitably bearing washers may of course be provided between the several pivoting surfaces in accordance with known pivot connections.

The pivotal connected elements 8 may thus pivot relative to the immediately adjacent duct elements in moving about the re-entry section 11 before the inner stop portions 22 of the end edge wall 19 and transverse stop wall 18 engage. However, the elements are prevented from opposite or upward pivoting when in the aligned beam position by the adjacent outer wall portions 18 and 21 which are engaging, or essentially so, in both beam sections 9 and 10.

The inner and outer walls of each duct element 18 are further shaped within the telescoping and telescoped sections to accommodate the pivotal movement of the elements.

The telescoping section 12 in particular includes an interior outer curved surface 32 and an interior inner curved surface 33. The surfaces are formed with similar radius struck from the center of the opening 24. The inner and outer curved surfaces 32 and 33 similarly merge with a reverse curved junction portions 34 and 35 to inclined interior walls 36 and 37 in the telescoped section 13. The outermost end edges are formed with a radius to define smooth end edges 38.

The exterior surface of the outer wall in the telescoping section 12 is inclined inwardly to the telescoped section 13 which is formed with curved portion 39 having the radius struck from the center of the pivot opening 29 in the telescoped section. The radius of the exterior wall surface of the telescoped section is slightly less than the radius of the interior surfaces of the telescoping section and merges into the smooth curved end edge 38. The inner wall is similarly formed with a radius portion 39a in section 13 merging into the bottom edge 38. The radius sections equal the extent of the inner overlap in the straight beam sections as well as the extent of the pivotal movement to allow such unimpeded pivotal movement.

Figure 6:
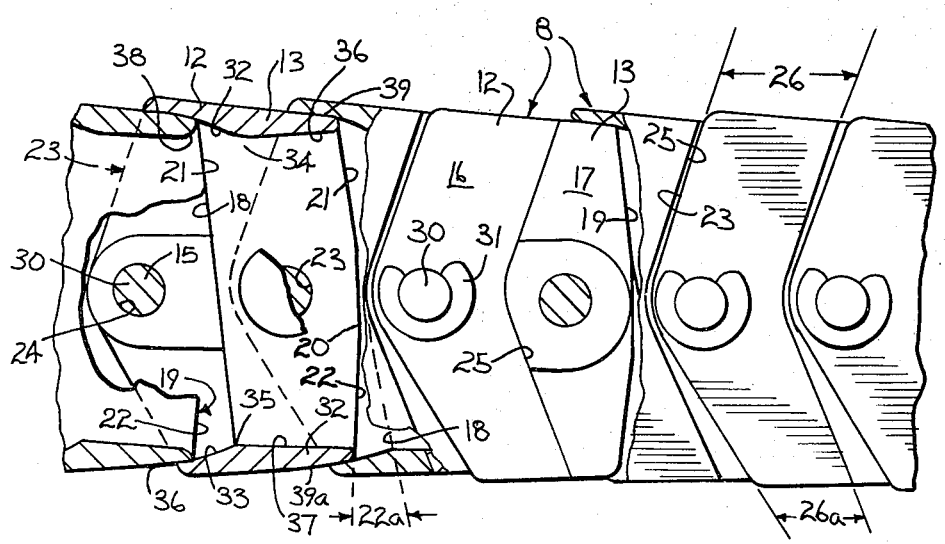
FIG. 6 is a vertical transverse section taken generally on line 6—6 of FIG. 4.

Thus, as shown most clearly in FIGS. 3, 3a and 6, in the beam position, the curved exterior surfaces 39 and 39a mate with the outer end portion of the interior surfaces 32 and 33 of the adjacent telescoping section. The curved end edges 38 of the telescoped section 13, the curved interior junctions 34 and 35 within each element and the inclined interior surfaces 36–37 of the telescoped sections 13 establish a smooth interior supporting surface for power lines 5 or such other flexible elements supported therein. As the guide elements 8 move through the re-entry section 11, the relative pivotal movement repositions the mating telescoping and telescoped section, as shown in FIG. 3, and with an increased angular overlap in the outer walls and a decreased overlap in the inner wall. The length of the sections 12 and 13 are such as to maintain a small overlap in the maximum pivotal position so as to maintain a total enclosure in the illustrated embodiment. The slightly different radius of the opposed mating top and bottom wall surfaces may establish a slight and practically paper thin constant spacement between the overlapped elements.

In summary, the individual guide duct elements 8 are cast of aluminum or other suitable material of the desired structural strength. The elements are telescoped and pivotally connected to form the proper guide length. The guide is secured to the trolley and to the power supply with the power cables 5 or other flexible elements located therein and resting on the lower supporting surfaces of the top and bottom beam sections 9 and 10 and turning about the re-entry section 11. The articulated movement of the elements 8 relative to each other in section 11 is limited by the angulated limit walls 18–22 to a radius equal to or greater than the safe bending radius for the cables. If the several flexible elongated elements supported in the guide are of different constructions, the turning limit would normally be selected for that of the most critical of the cables or other flexible elongated elements within the guide. In the illustrated embodiment, the power cables 5 are free to move between the inner and outer walls of the duct elements but are restricted in bending within the re-entry section 11 to the radius essentially corresponding to the neutral axis of bending for the power cables. As a result there is essentially no relative movement between the guide and the cables. Further, such slight relative movement as may occur is between the smooth exterior cable covering and the smooth inner surfaces including the rounded edges and connecting walls of the duct elements as heretofore discussed. As a result of this latter structural arrangement abrasion of the outer cable covering is minimized and for practical purposes may be non-existent. The total enclosure of the power cables of course protects them from foreign matter in the surrounding environment.

Figure 7:
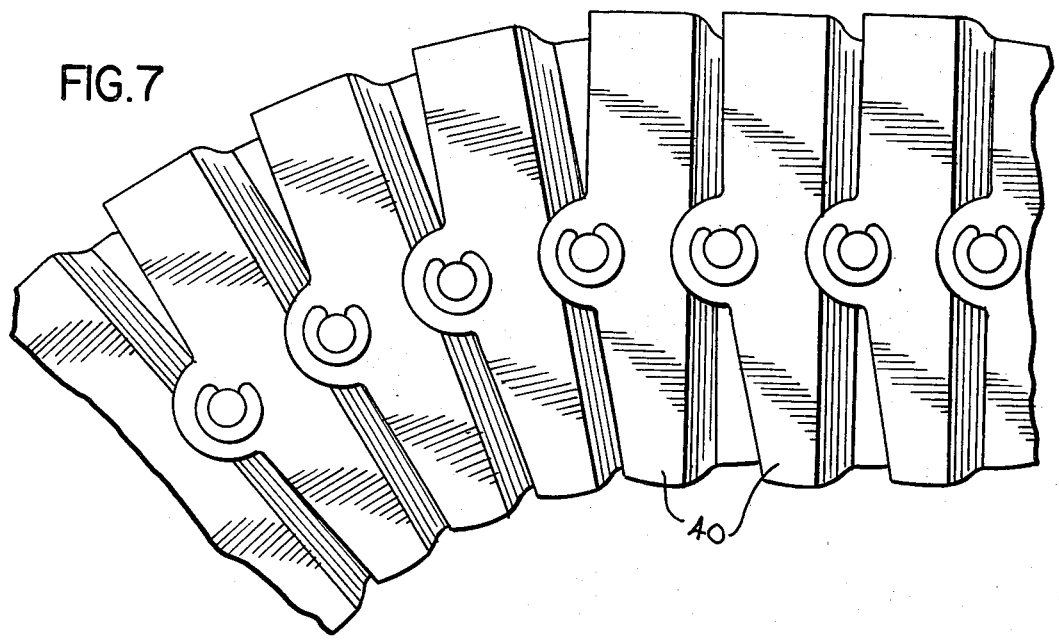
FIG. 7 is a side elevational view of an alternate embodiment.
Figure 8:
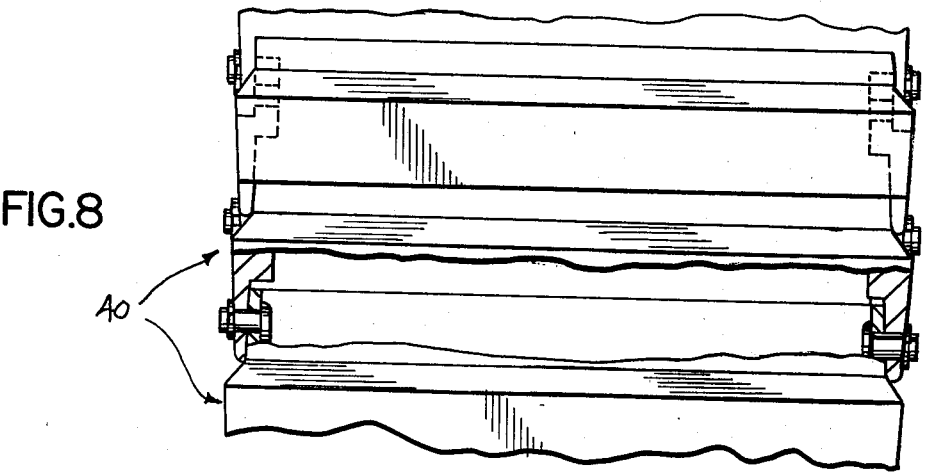
FIG. 8 is a plan view similar to FIG. 5 illustrating the side wall structure of the second embodiment.
Figure 9:
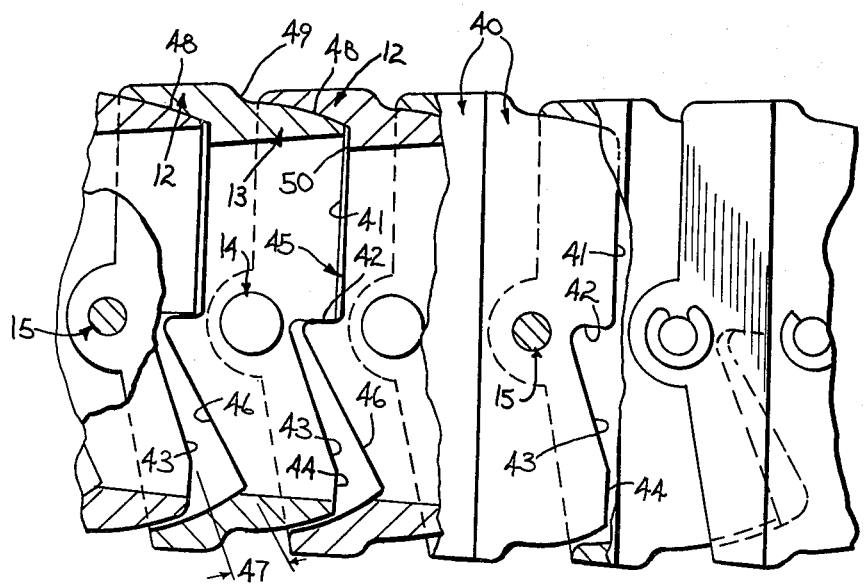
FIG. 9 is a side sectional view illustrating the pivot support connection of the second embodiment.

Although shown in a preferred embodiment in FIGS. 1–6, the structure of the duct element may be varied in its particulars while maintaining the telescopic relations of the elements. For example, a second embodiment similar to the referred embodiment is shown in FIGS. 7–9 and in which the corresponding walls and surfaces of successive duct elements 40 are generally identified for simplicity and clarity of explanation.

The walls of the telescoping and telescoped sections 12 and 13 are similarly offset planar walls and joined by a transverse tapered wall. The end edge of the telescoped section 13 includes a flat top vertical edge portion 41 joined by a generally horizontal portion 42 in alignment with the pivot axis and an inwardly angulated lower edge 43 portion to a final flat vertical bottom edge portion 44. The telescoping section 12 includes a similarly shaped interior side wall edge 45. The angulated lower or inner edge portion 46 however extends to the lower interior surface and is formed with greater angle than wall portion 43, as at 47. The sections 12 and 13 are thus similarly shaped with the pivot connections 14 and 15 located to hold the elements 40 in the beam position as shown in FIG. 9. Thus, the vertical edges 41 are in abuttment and establish a beam support. The angulated interior walls 43 and 46 are spaced as at 47 and allow movement through section 11, as shown in FIG. 7. The top and bottom walls of the duct elements are similarly formed with complementing curved interior and exterior surfaces 48 on the telescoping and telescoped sections 12 and 13. The exterior surface of the telescoping section is generally flat and joined to the curved surface of the telescoped section 13 by a smooth, curved junction wall portion 49. The interior top wall may be formed with a vertical stop wall 50 extending inwardly from the interior curved wall of the telescoping section 12 and located for engagement with the end edge 51 of the adjacent telescoped section 13 to prevent reverse rotation of the guide elements and thereby further support the beam position in the horizontal runs. As in the first embodiment, the stop surfaces are located within a protective enclosure of the cast duct elements 40 with all exterior surfaces formed to eliminate closing jaw-like surfaces.

Figure 10:
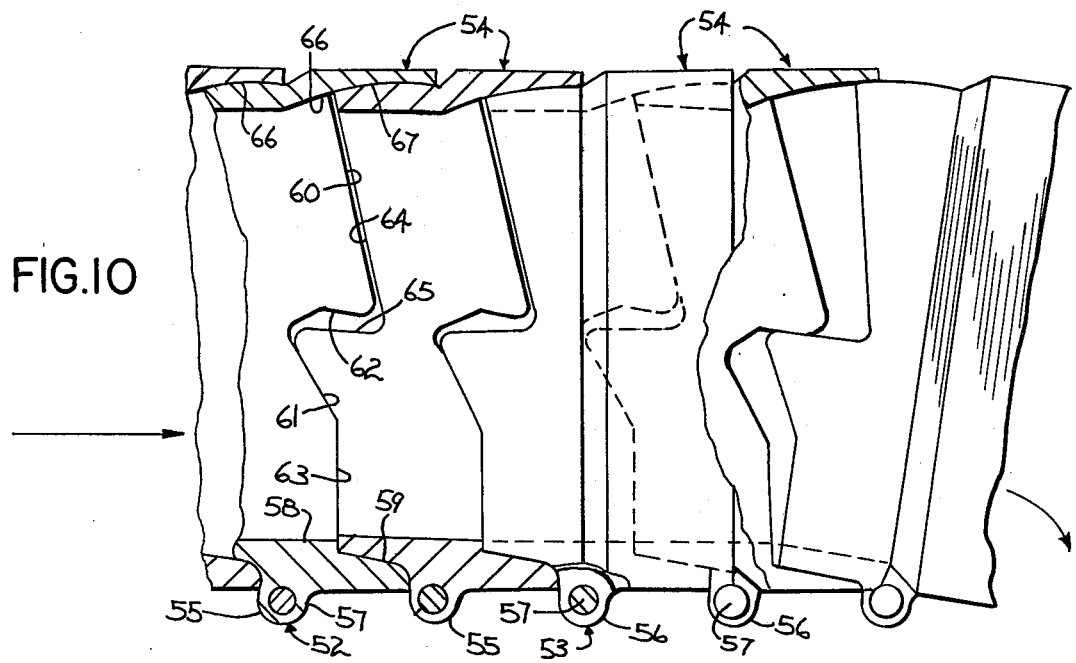
FIG. 10 is a side sectional view of a third embodiment illustrating a different location of the pivot connection.
Figure 11:
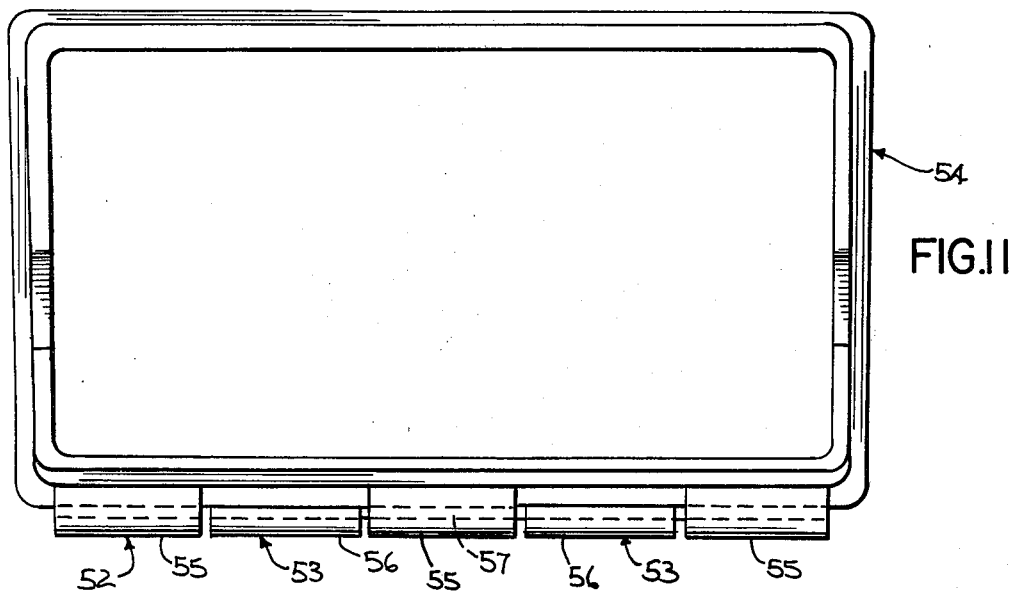
FIG. 11 is an end view of FIG. 10.
Figure 12:
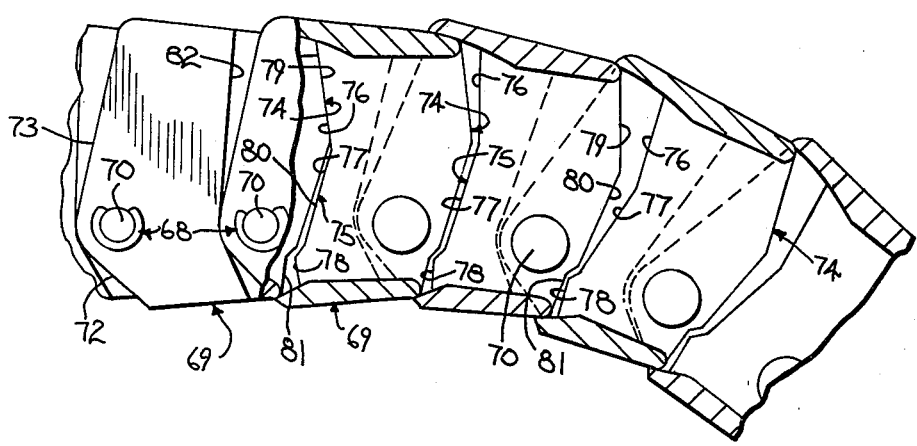
FIG. 12 is a side view with parts broken away illustrating a further cross sectional configuration of a duct element and pivot location.

Although the preferred centrally located pivot position is highly desirable, the present invention can of course be incorporated with other locations of the pivot members which provide for the telescoping of the tubular duct members. For example, FIGS. 10 and 11 inclusive, show a duct guide unit similar to that shown in FIGS. 7–9 but using a pair of spaced bottom pivot assemblies 52 and 53 interconnecting a series of telescoping duct elements 54 of rectangular cross sectional construction. In FIGS. 10–12, the flexible tubular conduit support is shown located for pivoting to the right through a correspondingly located re-entry section.

More particularly, the pivot assemblies 52 and 53 of the individual duct elements 54 are hinge-pin type connections extending generally in transverse plane and extending across the bottom wall of the duct elements 54. The duct elements 54 are formed with spaced hinge journals, with three journals 55 in the center of each element and two journals 56 at the end of each element which are spaced to mate in the telescoped position with the three journals of the adjacent element. In the aligned mating relationship, a suitable pivot pin 57 is inserted through the aligned journals 55–56 to define a more or less conventional hinge pin structure.

The duct elements 54 include the offset wall sections 12 and 13 as in the previous embodiments to define similar telescoping and telescoped sections. The bottom wall structure of each element 54 is however formed with offset portions 58 and 59 to the opposite sides of the central hinge pin journals 55 to define a beam support portion extending from the journal. Thus, the one wall 58 of the telescoping portion is inclined to complement the recess formed by the offset wall portion 59 of the adjacent duct element. The complementing bottom wall portions 58–59 prevent the pivotal movement in the counterclockwise direction, as shown in FIG. 10, and establish the beam support to the opposite sides of the re-entry section. As the support moves about the re-entry section, not shown in FIGS. 10–11, the elements may oppositely pivot, clockwise in FIG. 10, relative to the adjacent elements to a limited extent defined by the angular offset orientation of the limit walls as follows.

In the embodiment of FIGS. 10–11, the side walls include the pivot limit means. Thus, each side wall includes a transverse wall having an inclined top portion 60 and offset inclined lower wall portion 61 joined by a horizontal limit portion 62, which restricts the pivotal movement of the elements relative to each other. The lower portion of the limit wall inclines inwardly and terminates in a vertical portion 63 down to the bottom wall structure. The end edge 64 wall of the duct element 54 is similarly shaped with a horizontal wall 65 offset at a different angle and spaced from the wall portion 62 in the beam position, as shown in FIG. 10.

The complementing top walls of the duct elements include the interior curved wall 66 complementing a correspondingly exterior curved outer surface 67.

In operation, the duct support of FIGS. 10-11 is similar to that of the previous embodiment. In this embodiment, the bottom wall structures establish the beam position while permitting pivotal movement in the reentry section. The side wall portions 62 and 63 establishes the limit of such pivotal movement.

A further embodiment is illustrated in FIG. 12 wherein the top and bottom or outer walls are similar to that of the first embodiment are shown in FIGS. 1-6. In this embodiment, the pivot connection 68 of the duct members 69 similarly includes a pair of spaced pivot pins 70 which are located beneath the bending axis through the center plane of the duct members 69. The one end edge of the duct member 69 adjacent the one pivot opening pin 70 is generally an offset V-shaped configuration with the opposite edges 72 and 73 extending from the pivot pin alignment to the opposite top and bottom portions of the duct walls. The opposite end edge 74 is shaped to operate conjointly with an inner stop wall 75 which is formed with a special shape or configuration to define a stop wall. The inner stop wall 75 includes an outer inclined edge portion 76 which extends inwardly and laterally to a connecting edge portion 77 which extends downwardly past the pivot connection pin 70 and terminates in a generally vertical edge portion 78 with the duct element 69 in the beam position. The adjacent telescoped end edge 74 of the duct element has a generally complementing configuration which, in the beam position, includes an upper edge portion 79 abutting the outer edge portion of the inner stop wall 75. A connection edge wall portion 80 complementing the wall connecting edge is spaced therefrom in all positions. The lower or the inner end edge portion 81 curves inwardly generally complementing the wall edge portion, and has a somewhat greater extent of curvature so as to be spaced from the stop wall edge portion in the beam position. As the duct element 69 moves about the re-entry section 11, the duct element 69 pivots about the pivot connection 68, with the upper stop wall and end edge portions 76 and 79 separating and the lower stop wall and end edge portions 78 and 80 moving into engagement to establish the limited pivotal movement, as in the other embodiments.

The exterior side walls of the duct elements 69 are of course similarly configured with the offset construction and exterior transverse walls 82 which complement end edges 72-73. The angular orientation is again slightly offset to maintain a partial gap between the adjacent offset side wall portions 72-73 and 82 of the telescoped duct in all positions of the duct elements 69.

Within the broadest aspects of the present invention, other internal stop wall configurations may be developed. Rectangular duct members, not shown, having the spaced pivot side wall locations, may have the top and bottom walls shaped to define oppositely facing coupling end lips and channels. The duct members are assembled with the lips of each located in the related channels of the telescoped duct members so as to define the limits of pivotal movement from the beam position. For convenience of manufacture, the outer lip may be formed by a stop pin secured across the end of the recess.

The present invention provides a protective duct enclosure formed of similar tubular duct elements mounted in telescoping relation and having complementing top and bottom walls and side walls with mating offset stop walls which may be constructed in various configurations within the teaching of the present invention.

Various modes in carrying out the invention are contemplated as being within the scope of the following claims, particularly pointing out and distinctly claiming the subject matter which is regarded as the invention.

I claim:

1. A self-supportive guide duct apparatus for guiding elongated flexible elements connected between a pair of laterally displaced relatively moving devices with a fixed bending radius, comprising a series of tubular duct elements including substantially parallel end walls and interconnecting substantially parallel side walls and defining a continuous articulated tubular duct enclosure for receiving of said elongated flexible elements, first and second spaced pivot support means secured to said side walls for pivot connection of adjacent duct elements, said duct elements being mounted in telescoped relations with the opposite pivot support means aligned and connected to pivotally support adjacent telescoped duct elements, the telescoped duct elements having interfitting end walls and side walls, and said side walls including interior stop wall means arranged and oriented to permit relative limited pivotal movement from an in-line position in one direction only and establishing interior interference surfaces preventing pivotal movement in the direction opposite said one direction from said in-line position, the exterior walls of said telescoping duct portions and the adjacent opposed interior walls being constructed and shaped to define complementing curved surfaces establishing close fitting spaced telescoping portions during pivotal movement to maintain an essentially continuous tubular enclosing guide for the elongated flexible elements.

2. The guide duct apparatus of claim 1 wherein all of said duct elements are corresponding cast members having walls of substantially constant thickness including offset planar walls connected by interior transverse wall means and said side walls including end edges, said transverse wall means cooperating with an opposed end edge of the side walls of a telescope duct element to define said stop wall means.

3. The guide duct apparatus of claim 1 wherein said duct elements have side walls including offset planar walls joined by a transverse wall defining an interior stop wall located in opposed relation to the inner end edge of the adjacent element, said transverse wall having an exterior which extends away from said interior stop wall.

4. A self-supportive guide duct apparatus for guiding elongated flexible elements connected between a pair of laterally displaced relatively moving devices with a fixed bending radius, comprising a series of duct elements defining a continuous articulated tubular duct, each of said elements having side walls connected by end walls and being tubular in shape and said side walls having first and second spaced pivot support means for pivot connection to adjacent duct elements, said duct elements being mounted in telescoped relations with the opposite pivot support means aligned and pivotally connected, the telescoped duct elements having interfitting side walls including interior offset stop wall means arranged and oriented to permit relative limited pivotal movement from an in-line position in one direction only and establishing interference surfaces preventing pivotal movement in the direction opposite said one direction from said in-line position whereby said offset stop wall means are totally enclosed within the tubular duct, said end walls having interior and exterior surfaces of a differing configuration and with the opposed interior and exterior walls having complementing curved surfaces having a similar radius for permitting said limited pivotal movement.

5. The duct apparatus of claim 4 wherein said exterior walls of said duct elements being constructed and shaped to define spaced end edges and opposed transverse wall means in all relative positions of said duct elements and with complementing interior and exterior surfaces establishing close fitting spaced telescoping portions during the pivotal movement to maintain an essentially continuous tubular duct.

6. The guide duct apparatus of claim 4 wherein all of said duct elements are corresponding cast members having side walls of substantially constant thickness including offset planar side walls connected by interior and exterior transverse wall means, said side walls having end edges, said interior transverse side wall means being located in opposed relation to the end edge of the adjacent duct element and defining said stop wall means.

7. The guide duct apparatus of claim 5 wherein said exterior transverse walls are generally V-shaped and extend away from said interior wall and outwardly from the pivot connection to the end walls.

8. The self-supportive guide duct apparatus of claim 5 wherein each of said duct elements is a cast member having inclined said top and bottom exterior walls in a first tubular portion extending toward each other and to a second tubular portion, said first tubular portion having interior curved walls formed with a common radius from said first pivot means, said second portion having said top and bottom exterior walls formed with a common radius slightly less than said first common radius and from said second pivot means.

9. The self-supportive guide duct apparatus of claim 5 wherein each of said duct elements is a substantially rectangular cast member having said side walls and said opposite connecting end walls, said one end wall of adjacent end walls being complementing curved members and the other of said end walls being complementing notched members preventing pivotal movement in one direction, said side walls including end edges and including offset portions connected by transverse interior walls located in opposed relation to the end edges of the adjacent duct elements and limiting the pivotal movement.

10. The self-supportive guide duct apparatus of claim 5 wherein said duct elements are substantially rectangularly shaped having side walls and connecting end walls, said end walls including a first curved interior portion with a first common radius from said first pivot means and a second curved exterior portion with a second common radius from said second pivot means and said second common radius being slightly less than said first common radius, said side walls include a common planar wall in each of said first and second portions and including end edges, said planar walls being offset and joined by a transverse connecting wall portion, said interior transverse connecting wall portions of telescoped duct elements defining pivot limit walls having a first stop portion engaged with the end edge of said adjacent duct element in the in-line position and second stop portion spaced from the adjacent duct element in the beam position and abutting with said adjacent element when pivoted to the maximum angle necessary to move in said fixed bonding radius.

11. The guide duct apparatus of claim 10 wherein said interior transverse wall is a linear substantially flat wall and the opposed end edge of said side wall of the adjacent telescoped duct element is shaped with offset substantially flat stop portions.

12. A self-supportive guide duct apparatus for guiding elongated flexible elements in substantially spaced rectilinear paths and around a substantially semi-circular connecting re-entry path between a pair of laterally spaced and relatively moving devices, comprising a continuous series of telescoping duct elements defining an essentially continuous tubular flexible enclosure, each duct element being a cast member and having a first exterior tubular portion telescoping over an adjacent duct element and second tubular portion telescoped into the opposite adjacent duct element, a first pivot means secured to side wall portions of said first tubular portion and second pivot means secured to side wall portion of said second tubular portion and to the side walls of said adjacent telescoped duct elements to pivotally secure said elements in telescoped relation, said telescoped portions of said duct elements having interfering opposed internal surface portions permitting limited relative pivotal movement in one selected direction from a linear beam position for movement around said semicircular connecting re-entry path and preventing pivotal movement in the opposite direction from said linear beam position to hold said elements in linear relationship as a self-supportive beam along said rectilinear paths, and said telescoped duct elements including complementing opposed interior and exterior end walls connecting said side walls and having complementing curved surfaces to maintain an essentially closed structure in said semicircular connecting re-entry path.

13. The self-supportive guide duct apparatus of claim 12 wherein said interior top wall and bottom wall of said first portion has a first common radius from said first pivot means, and said exterior top wall and bottom wall of said second portion has a second common radius from said second pivot means and said second common radius is slightly less than said first common radius.

14. The guide duct apparatus of claim 13 wherein each duct element has a substantially rectangular cross-section having parallel side walls and substantially parallel opposite end walls, said side walls each including transversely offset planar walls in the telescoping and telescoped portions connected by a transverse wall, the interior of the end walls of said telescoping duct portion and the adjacent opposed exterior walls of the telescoped element being constructed and shaped to define complementing curved surfaces for permitting said relative pivotal movement, said exterior end edge wall of the duct element and the inner transverse wall portion being shaped to define complementing aligned and spaced wall portions in all positions of the duct elements and said inner end edge wall and opposite interior transverse wall portion including walls abutting in the beam position and second transverse walls spaced in accordance with said permitted angular pivotal movement created in said re-entry path.

15. The guide duct apparatus of claim 14 wherein said end walls of adjacent duct are constructed to permit said pivotal movement in said one direction from an in-line position and establishing interference surfaces preventing pivotal movement in the direction opposite said one direction.

16. The guide duct apparatus of claim 13 wherein pivot connection means are located generally centrally of the side walls, said side walls having planar offset side walls connected by interior transverse wall means arranged and oriented to one side of said pivot means to permit said relative limited pivotal movement from an in-line position in one direction only and to the opposite side of said pivot means establishing interference surface preventing pivotal movement in the direction opposite said one direction.

17. The self-supportive guide duct apparatus of claim 16 wherein each of said duct elements is a cast member having the exterior transverse walls and opposed end edge walls substantially V-shaped spaced walls in all element positions, the interior transverse wall and said opposed end edges of the elements including first opposed straight flat wall portions permitting limited relative pivotal movement in said selected direction around said semicircular path and straight flat wall portions preventing pivotal movement in said opposite direction.

18. The guide duct apparatus of claim 13 wherein said duct elements are rectangular cast-metal members having side walls including offset planar wall portions joined by transverse wall means including interior stop wall portions located in opposed relation to the end edge of the adjacent duct element, said end edge and interior wall portion each having extended first and second stop walls being spaced in the beam position and thereby oriented to permit relative limited pivotal movement from the beam position in one direction only and said second stop walls establishing interference surface preventing pivotal movement in the direction opposite said one direction, said transverse wall means including exterior wall portions extending away from said interior wall portion to increase the thickness of the side walls adjacent the stop wall portion.

19. The self-supportive guide apparatus of claim 12 wherein said side walls include a common planar wall in each of said first and second portions, said planar walls being offset and joined by a transverse connecting wall, said transverse connecting wall having an interior portion defining pivot limit walls having a first stop portion engaged with said adjacent duct element in the beam position and second stop portion spaced from the adjacent duct element in the beam position and abutting with said adjacent elements pivoted to the maximum angle necessary to move in said semicircular path, said opposite end edge and said exterior portion of said transverse connecting wall having a generally channel-shaped configuration defining an exterior substantially continuous side wall in the guide duct apparatus with a continuous gap between the opposed end edge and transverse wall.

20. The guide duct apparatus of claim 19 wherein said duct element is formed with smooth curved exterior edges to prevent formation of pinching jaws at said continuous gap.

21. A self-supportive guide duct apparatus flexible enclosure for guiding elongated flexible elements in substantially spaced rectilinear paths and around a substantially semicircular connecting re-entry path between a pair of laterally spaced and relatively moving devices, comprising a continuous series of telescoping duct elements defining an essentially continuous tubular, each duct element being a substantially rectangular duct having a first exterior tubular portion telescoping over an adjacent duct element and second tubular portion telescoped into the opposite adjacent duct element, a first pivot means secured to said first tubular portion and second pivot means secured to said second tubular portion and to said adjacent duct elements to pivotally secure said elements in telescoped relation, said duct elements having sidewalls including offset planar portions joined by a transverse wall including an inner wall portion located in opposed relation to the end edge of the adjacent telescoped duct element, one of said transverse walls and end edge including angularly oriented wall portions to the opposite sides of a connecting wall portion and the other of said transverse walls and end edge being a single angularly oriented surface to define spaced stop walls in the beam position permitting limited relative pivotal movement in one selected direction around said semicircular path and second adjacent engaged stop walls in the beam position preventing pivotal movement in the opposite direction to hold said elements in linear relationship along said rectilinear paths, said transverse wall means including exterior wall portions extending away from said interior wall portion to increase the thickness of the side walls adjacent the stop wall portion, and said duct elements including end walls secured to said side walls and constructed to maintain an essentially closed tubular structure in said semicircular connective path.

* * * * *